(12) United States Patent
Shiraishi et al.

(10) Patent No.: US 6,697,440 B1
(45) Date of Patent: Feb. 24, 2004

(54) DEMODULATOR OF RECEIVER

(75) Inventors: Kenichi Shiraishi, Yokohama (JP); Soichi Shinjo, Machida (JP); Akihiro Horii, Zama (JP); Shoji Matsuda, Machida (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/622,062

(22) PCT Filed: Feb. 25, 1999

(86) PCT No.: PCT/JP99/00880

§ 371 (c)(1), (2), (4) Date: Aug. 25, 2000

(87) PCT Pub. No.: WO99/44342

PCT Pub. Date: Sep. 2, 1999

(30) Foreign Application Priority Data

Feb. 25, 1998 (JP) .......................................... 10-060709

(51) Int. Cl.⁷ ............................. H03D 3/22; H04L 27/22
(52) U.S. Cl. ...................... 375/329; 375/326; 375/279; 329/304
(58) Field of Search .............................. 375/279, 271, 375/282, 322, 329, 333, 326, 327, 344, 373, 376, 361, 362; 329/304, 306–310

(56) References Cited

U.S. PATENT DOCUMENTS

| | | | | |
|---|---|---|---|---|
| 4,866,395 A | * | 9/1989 | Hostetter | 329/309 |
| 5,245,611 A | * | 9/1993 | Ling et al. | 370/347 |
| 5,287,067 A | * | 2/1994 | Denno et al. | 329/304 |
| 5,406,587 A | * | 4/1995 | Horwitz et al. | 375/346 |
| 5,872,812 A | * | 2/1999 | Saito et al. | 375/261 |
| 6,341,123 B1 | * | 1/2002 | Tsujishita et al. | 370/210 |

FOREIGN PATENT DOCUMENTS

| | | |
|---|---|---|
| JP | 53-077455 | 7/1978 |
| JP | 53-137657 | 12/1978 |
| JP | 60-10854 | 1/1985 |
| JP | 63-042253 | 2/1988 |
| JP | 1-188144 | 7/1989 |
| JP | 6-268701 | 9/1994 |
| JP | 9-186730 | 7/1997 |
| JP | 09-321813 | 12/1997 |
| JP | 10-215291 | 8/1998 |
| JP | 10-341263 | 12/1998 |
| JP | 11-46221 | 2/1999 |
| JP | 11-317780 | 11/1999 |

* cited by examiner

*Primary Examiner*—Phoung Phu
(74) *Attorney, Agent, or Firm*—Eric J. Robinson; Robinson Intellectual Property Law Office, P.C.

(57) ABSTRACT

A small scale circuit can be realized. A timing circuit 30 detects a burst symbol signal period from outputs I and Q of a demodulating circuit 1A for orthogonally detecting a received signal obtained by time-multiplexing digital signals by BPSK, QPSK, and 8PSK modulation. A pattern regeneration circuit 40 outputs the same PN code pattern as on a transmission side. Inverting circuits 13 and 14 output I, Q as RI, RQ for a bit '0' of a PN code pattern, and −I, −Q as RI, RQ for a bit '1'. A phase error table 15A contains a phase error between the phase of a received signal point as an output of the inverting circuits 13 and 14 and an absolute phase only for a first quadrant of RI, RQ. A phase error detecting processing circuit 16A reads the phase error data corresponding to the absolute value of RI, RQ, and adjusts the data into the data depending on the current quadrant of the RI, RQ. A carrier regeneration circuit 10A amends the phase of a reference carrier for use in orthogonal detection such that an adjusted phase error data indicates zero.

2 Claims, 13 Drawing Sheets

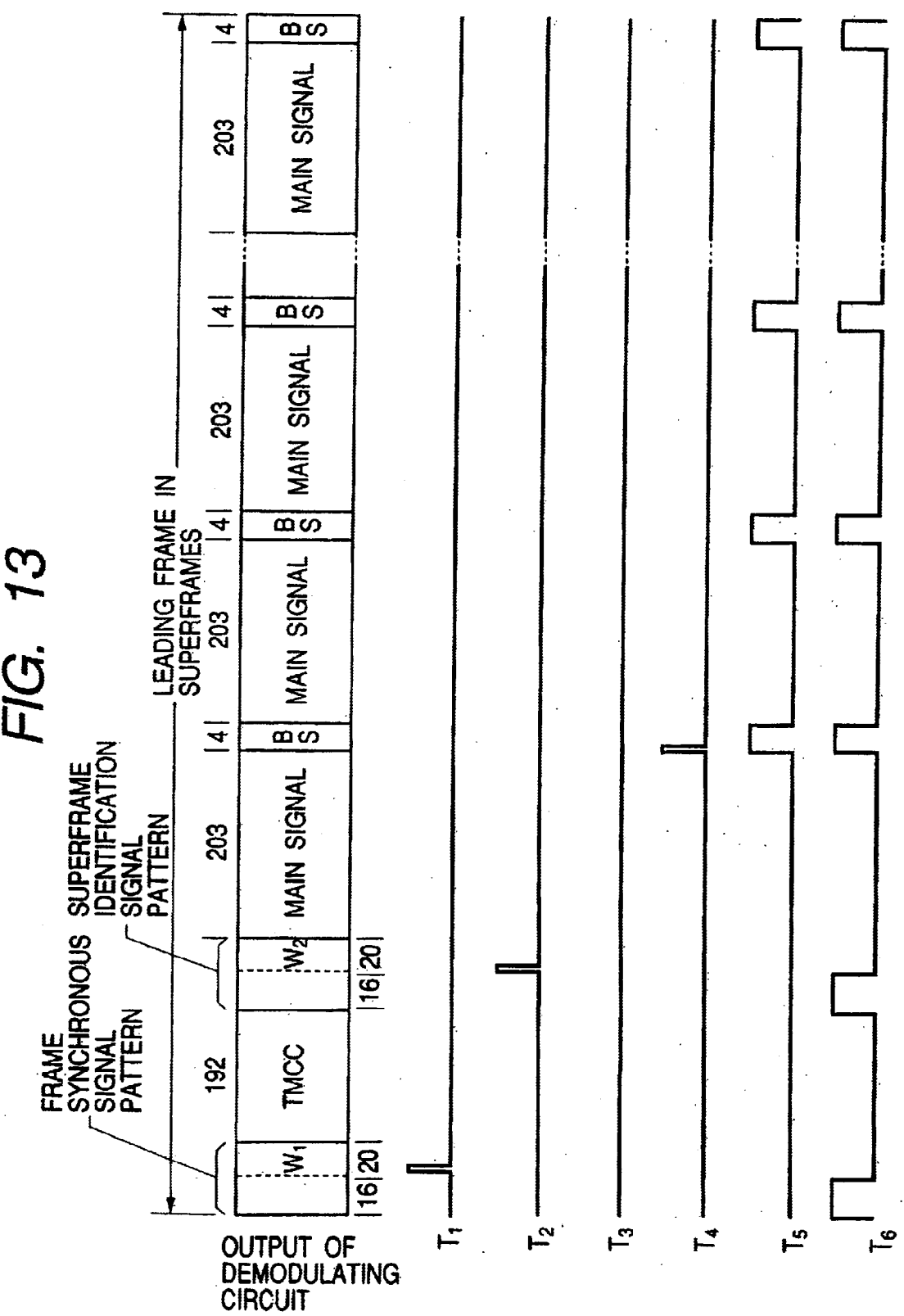

DEMODULATOR OF RECEIVER

TECHNICAL FIELD

The present invention relates to a demodulating apparatus of a receiver, and more specifically to a demodulating apparatus of a receiver for demodulating a PSK modulated signal obtained by time-multiplexing a digital signal modulated in a 2-phase, 4-phase, and 8-phase PSK modulation system in a hierarchical transmission system, etc. by using a carrier regenerated by carrier regeneration means, and outputting an I-Q symbol stream data.

BACKGROUND ART

A digital satellite TV broadcast in a plurality of modulation systems in which different necessary C/Ns are required, for example, in a hierarchical transmission system in which an 8 PSK modulated wave, a QPSK modulated wave, and a BPSK modulated wave are time-multiplexed and repeatedly transmitted for each frame has been developed for practical use.

FIG. 8 shows an example of the configuration of one transmission frame in the hierarchical transmission system. One frame includes a frame synchronous signal pattern (predetermined 20 symbols are actually used as a frame synchronous signal in 32 symbols) formed by 32 BPSK-modulated symbols, a TMCC (transmission and multiplexing configuration control) pattern for transmission multiplexing configuration identification formed by 128 BPSK-modulated symbols, a superframe identification pattern formed by 32 symbols (predetermined 20 symbols are actually used as a superframe identification signal in 32 symbols), a main signal having 203 8 PSK (trellis codec 8 PSK) modulated symbols, a 4-symbol burst symbol signal (BS) obtained by BPSK-modulating a pseudo random noise (PN) signal, a main signal having a 203 8 PSK (trellis codec 8 PSK) modulated symbols, a 4-symbol burst symbol signal (BS) obtained by BPSK-modulating a pseudo random noise (PN) signal, a main signal having 203 QPSK-modulated symbols, a 4-symbol burst symbol signal (BS) obtained by BPSK-modulating a pseudo random noise (PN) signal, a main signal having 203 QPSK-modulated symbols, and a burst symbol signal (BS) having 4 BPSK-modulated symbols in this order.

Here, the mapping for each modulation system on the transmission side will be described below by referring to FIGS. 9A–9C. FIG. 9A shows a signal point arrangement at the I-Q phase (an I-Q vector or an I-Q signal space diagram) when the 8 PSK modulation system is used. In the 8 PSK modulation system, a 3-bit digital signal (abc) can be transmitted as 1 symbol, and there can be 8 combinations of bits forming 1 symbol, that is, (0 0 0), (0 0 1), (0 1 0), (0 1 1), (1 0 0), (1 0 1), (1 1 0), and (1 1 1). These 3-bit digital signals are converted into the signal point arrangements 0 through 7 in the I-Q phase on the on the transmission side as shown in FIG. 9A. The conversion is referred to as 8 PSK mapping.

In an example shown in FIG. 9A, the bit string (0 0 0) is converted into the signal point arrangement '0', the bit string (0 0 1) is converted into the signal point arrangement '1', the bit string (0 1 1) is converted into the signal point arrangement '2', the bit string (0 1 0) is converted into the signal point arrangement '2', the bit string (1 0 0) is converted into the signal point arrangement '3', the bit string (1 0 0) is converted into the signal point arrangement '4', the bit string (1 0 1) is converted into the signal point arrangement '5', the bit string (1 1 1) is converted into the signal point arrangement '6', and the bit string (1 1 0) is converted into the signal point arrangement '7'.

FIG. 9B shows the signal point arrangement at the I-Q phase when a QPSK modulation system is used. In the QPSK modulation system, a 2-bit digital signal (de) can be transmitted as 1 symbol, and there can be 4 combinations of bits as a symbol. They are (0 0), (0 1), (1 0), and (1 1). In the example shown in FIG. 9B, for example, the bit string (0 0) can be converted into the signal point arrangement '1', the bit string (0 1) can be converted into the signal point arrangement '3', the bit string (1 1) can be converted into the signal point arrangement '5', and the bit string (1 0) can be converted into the signal point arrangement '7'.

FIG. 9C shows the signal point arrangement when a BPSK modulation system is used. In the BPSK modulation system, a 1-bit digital signal (f) can be transmitted as 1 symbol. In the digital signal (f), for example, the bit (0) is converted into the signal point arrangement '0', and the bit (1) is converted into the signal point arrangement '4'. The relationship between the signal point arrangement and the arrangement number in each modulation system is defined such that the signal point arrangement is equivalent to the arrangement number based on the 8 BPSK.

The I axis and the Q axis of the QPSK and the BPSK in the hierarchical transmission system match the I axis and the Q axis of the 8 PSK.

Eight frames shown in FIG. 8 form one superframe. In the area of 20 predetermined symbols of a frame synchronous signal pattern in each frame, a well-known 20-bit digital signal pattern (referred to as $W_1$) is BPSK-mapped. In the area of 20 predetermined symbols of a superframe identification signal pattern as a leading frame in a superframe, a well-known 20-bit digital signal pattern (referred to as $W_2$) different from $W_1$ is BPSK-mapped. In the area of 20 predetermined symbols of a superframe identification signal pattern in each frame other than the leading frame in a superframe, a well-known 20-bit digital signal pattern (referred to as $W_3$, and obtained by inverting each bit of $W_2$) is BPSK-mapped.

In the receiver for receiving a digital modulated wave (PSK modulated wave) in the hierarchical transmission system, the intermediate frequency signal of a signal received by a reception circuit is demodulated through orthogonal detection by a demodulating circuit, thereby obtaining two sequences of I-Q base band signals (hereinafter, the I-Q base band signal can also be referred to as I-Q symbol stream data) indicating the momentary value for each symbol off the I axis and the Q axis orthogonal to each other. However, when there is a shift in phase between the carrier before the modulation of an input of the demodulating circuit and the reference carrier regenerated in the demodulating circuit, the received signal point of the modulated I-Q base band signal is phase-rotated toward the transmission side. Therefore, the digital signal transmitted on the transmission side cannot correctly recover if the data is input as it is to the decoder and PSK-mapped.

Each of the burst symbol signals (BS) shown in FIG. 8 is obtained by resetting the PN code generator having a predetermined configuration at the starting position of the initial burst symbol signal (BS) in a frame on the transmission side, shifting the output according to the symbol clock at each period in the transmission frame configuration, and performing a BPSK mapping process.

The demodulating circuit uses a burst symbol signal (BS) as a pilot signal for amendment of the phase of the reference carrier, and allows the phase of the carrier in the state before the modulation of the received signal to match the phase of the reference carrier, thereby setting the absolute phase such that the signal point of the I-Q base band signal output from the demodulating circuit as matching the signal point on the transmission side.

FIG. 10 shows, the configuration of the demodulating circuit of the receiver for receiving the PSK modulated wave in the conventional hierarchical transmission system. A demodulating circuit 1 shown in FIG. 10 obtains an I-Q base band signal by orthogonally detecting the intermediate frequency signal of a received signal. 10 denotes a carrier regeneration circuit for regenerating two reference carriers $f_{c1}$ (=cos ωt), and $f_{c2}$ (=sin ωt) whose frequencies and phases are synchronized with those of the carrier in the state before the modulation of the input of the demodulating circuit 1, and whose phases are 90° shifted to each other to be orthogonal to each other. 2 and 3 denote multipliers for multiplying the intermediate frequency signal IF by the reference carriers $f_{c1}$ and $f_{c2}$. 4 and 5 denote A/D converters for A/D converting the output of the multipliers 2 and 3 at a sampling rate of double the symbol rate. 6 and 7 denote digital filters for limiting the band in a digital signal process performed on the output of the A/D converters 4 and 5. 8 and 9 denote thinning circuits for thinning the output of the digital filters 6 and 7 at the sampling rate of 1/2, and outputting two sequences of I-Q base band is signals (I-Q symbol stream data) indicating the momentary value of each symbol of the I axis and the Q axis. The thinning circuits 8 and 9 transmit the 1-Q base band signals I (8) and Q (8) (the numerals in the parentheses denote the numbers of quantization bits, which will be hereinafter referred to simply as I-Q for short) having 8 (complement of 2) quantization bits.

If the phase of a carrier in the state before modulation at the input of the demodulating circuit 1 matches the phase of the reference carriers $f_{c1}$ and $f_{c2}$ regenerated by the carrier regeneration circuit 10, then the phase of the received signal point in the I-Q phase by the I-Q base band signals I (8) and Q (8) on the reception side when the digital signal corresponding to the signal point arrangement '0' through '7' in the I-Q phase on the transmission side is received matches the phase on the transmission side. Therefore, the digital signal received from the signal point arrangement of the received signal point can be correctly identified by directly using the correspondence (refer to FIGS. 9A–9C) between the signal point arrangement on the transmission side and the digital signal.

However, since the reference carriers $f_{c1}$ and $f_{c2}$ can be actually in various phase states for the carrier in the state before the modulation of the input of the demodulating circuit 1, the received signal point on the reception side is the phase position set by turning from the position on the transmission side by a predetermined angle θ. When the phase of the carrier in the state before the modulation of the input of the demodulating circuit 1 is changed, the angle θ is also changed. If the phase of the received signal point rotates at random from the phase on the transmission side, then the received digital signal cannot be identified. For example, at the time of θ=π/8, the digital signal (0 0 0) as the signal point arrangement '0' in the 8 PSK modulation system on the transmission side has the received signal point between the signal point arrangements '0' and '1' on the reception side. Therefore, if it is assumed that the digital signal (0 0 0) is received at the signal point arrangement '0', it is correctly received. However, if it is assumed that the signal is received at the signal point arrangement '1', it is mistakenly recognized that a digital signal (0 0 1) has been received. Then, the carrier regeneration circuit 10 amends the phase of the reference carriers $f_{c1}$ and $f_{c2}$ such that the received signal point can match the point on the transmission side to correctly identify the digital signal.

Specifically, the reference carrier $f_{c1}$ is generated by oscillating a VCO (voltage control oscillator) 11 of the carrier regeneration circuit 10, and the reference carrier $f_{c2}$ is generated by 90° delaying the phase of the oscillation signal of the VCO 11 by a 90° phase shifter 12. Then, the phase of the reference carriers $f_{c1}$ and $f_{c2}$ can be variable by varying the control voltage of the VCO 11.

In the carrier regeneration circuit 10, 13 and 14 are inverting circuits for selectively inverting the code of an I-Q base band signal output from the demodulating circuit 1 according to an output value of a well-known pattern regeneration circuit described later. 15 denotes a phase error table containing a phase error from an absolute phase for a received signal point in the state of the output of the inverting circuits, 13 and 14, and includes ROM. In this example, as described later, the absolute phase is fixed to 0 (=2π). FIG. 11 shows the relationship between the phase angle φ made by the received signal point of the I-Q phase in the state of the output of the inverting circuits 13 and 14 and the positive direction of the I axis and the phase error data Δφ. The phase error data Δφ represents 8 quantization bits (complement of 2).

16 denotes a phase error detecting processing circuit for reading the phase error data Δφ (8) corresponding to the output of the inverting circuits 13 and 14 from the phase error table 15, and outputting it to a D/A converter 17. After the phase error data Δφ (8) is converted into a phase error voltage by the D/A converter 17, the lower band element is extracted by an LPF 18, and is applied as a control voltage to the VCO 11. If the phase error data Δφ (8) is 0, then an output of the LPF 18 is not changed, and the phases of the reference carriers $f_{c1}$ and $f_{c2}$ are not changed. However, if the phase error data Δφ (8) is positive (+), an output of the LPF 18 becomes large, the phases of the reference carriers $f_{c1}$ and $f_{c2}$ are delayed. On the other hand, if the phase error data Δφ (8) is negative (−), an output of the LPF 18 becomes small, and the phases of the reference carriers $f_{c1}$ and $f_{c2}$ are forwarded.

A timing circuit 30 is provided on the output side of the demodulating circuit 1, detects the starting timing in each symbol period corresponding to the frame synchronous signal pattern $W_1$, and the superframe identification signal patterns $W_2$ and $W_3$ regardless of the existence/non-existence of the phase rotation as compared with the transmission side of the I-Q base band signal, and outputs timing signals $T_1$ through $T_3$. Furthermore, it detects a starting timing of the first burst symbol signal (BS) in a frame, and outputs a timing signal $T_4$. In addition, it detects the period of the burst symbol signal (BS), and detects a period signal $T_5$ indicating 'H' for the period of the burst symbol signal, and 'L' for other periods. Furthermore, it detects a symbol period corresponding to a superframe identification signal pattern $W_1$, and a symbol period corresponding to superframe identification signal patterns $W_2$ and $W_3$, and outputs a period signal $T_6$ indicating 'H' for the above described periods and the period of the burst symbol signal (BS), and indicating 'L' for other periods (refer to FIGS. 12 and 13).

40 denotes a pattern regeneration circuit, 41 denotes a frame synchronous signal pattern output circuit for outputting a 20-bit frame synchronous signal pattern $W_1$ in the period of 20 symbols from the input timing of $T_1$, 42 denotes a first superframe identification signal pattern output circuit for outputting a 20-bit superframe identification signal pattern $W_2$ in the period of 20 symbols from the input timing of $T_2$, 43 denotes a second superframe identification signal pattern output circuit for outputting a 20-bit superframe identification signal pattern $W_3$ in the period of 20 symbols from the input timing of $T_3$, 44 denotes a PN code generator, has the same configuration as the PN code generator for generating a PN code string for a burst symbol signal (BS) on the transmission side, changes its output according to a symbol clock while the period signal $T_5$ indicates 'H' after it is reset at the starting timing of the first burst symbol signal (BS) in the frame according to $T_4$, and outputs the same pattern as the PN code pattern before the BPSK mapping of each burst symbol signal (BS) in the output of the demodulating circuit 1 at the same timing as the burst symbol signal (BS).

45 denotes an OR circuit for outputting a logical sum of the outputs of the frame synchronous signal pattern output circuit 41, the first superframe identification signal pattern output circuit 42, the second superframe identification signal pattern output circuit 43, and the PN code generator 44. 46 is an AND circuit for obtaining a logical product of the OR circuit 45 and the period signal $T_6$.

The above described pattern regeneration circuit 40 regenerates a corresponding bit string pattern for the symbol corresponding to the 20-bit frame synchronous signal pattern $W_1$ appearing in the I-Q symbol stream output from the demodulating circuit 1, the symbol corresponding to the 20-bit superframe identification signal patterns $W_2$ and $W_3$, and the burst symbol signal (BS). The $W_1$, $W_2$, and $W_3$, and the PN code before the BPSK mapping of the burst symbol signal (BS) are well-known bit string patterns on the transmission side, and are BPSK-mapped. As shown in FIG. 9C, the bit 0 is mapped at the signal point arrangement '0' (absolute phase 0) on the transmission side, and the bit 1 is mapped at the signal point arrangement '1' (absolute phase $\pi$) on the transmission side.

The above described inverting circuits 13 and 14 respectively output the I-Q base band signals I (8) and Q (8) output from the demodulating circuit 1 as they are when the output of the pattern regeneration circuit 40 is a bit '0'. At this time, the original absolute phase in the state on the transmission side of the received signal point indicated by the output RI (8)=I (8), RQ (8)=Q (8) is 0. On the other hand, the inverting circuits 13 and 14 inverts and outputs the code of the I-Q base band signal output from the demodulating circuit 1 when the output of the pattern regeneration circuit 40 is a bit '1'. Inverting a code is forwarding the phase of a received signal point by $\pi$, and this indicates that the original absolute phase on the transmission side of the received signal point indicated by the outputs RI (8)=-I (8), and RQ (8)=-Q (8) of the inverting circuits 13 and 14 can also be assumed to be 0 (=2$\pi$).

The phase of then received signal point after demodulating the transmission signal BPSK-mapped at the bit '0' on the transmission side can be amended into 0 by reading the phase error data $\Delta\phi$ (8) corresponding to the output of the inverting circuits 13 and 14 from the phase error table 15 when the output of the pattern regeneration circuit 40 is '0', and amending the phases of the reference carriers $f_{c1}$ and $f_{c2}$ such that the phase error data $\Delta\phi$ (8) can be zero. Similarly, the phase of the received signal point after demodulating the transmission signal BPSK-mapped at the bit '0' on the transmission side can be amended into $\pi$ by reading the phase error data $\Delta\phi$ (8) corresponding to the output of the inverting circuits 13 and 14 from the phase error table 15 when the output of the pattern regeneration circuit 40 is '1', and amending the phases of the reference carriers $f_{c1}$ and $f_{c2}$ such that the phase error data $\Delta\phi$ (8) can be zero. Therefore, the demodulating circuit 1 can output an absolute-phase I-Q base band signal, and the decoder at a later stage can perform a PSK demapping process without fail.

The D/A converter 17 D/A converts and outputs the phase error data $\Delta\phi$ (8) in the period only when the period signal $T_6$ at the H level is input from the timing circuit 30. While the $T_6$ indicates the L level, the D/A converter 17 holds the last output value obtained when the $T_6$ indicated the H level immediately before.

However, in the conventional receiver described above, it is necessary to define a phase error table for the entire range from the first quadrant to the fourth quadrant in the I-Q phase indicated by the outputs of the inverting circuits 13 and 14, thereby causing the problem of large memory requirements.

The present invention aims at providing a demodulating apparatus of a receiver requiring only a small circuit.

DISCLOSURE OF THE INVENTION

The demodulating apparatus according to claim 1 for use in a receiver having a demodulating unit for demodulating a PSK modulated signal obtained by time-multiplexing digital signals modulated in various PSK modulation systems by using a carrier regenerated by a carrier regeneration unit, and outputting I-Q symbol stream data in a symbol unit includes: regeneration means for regenerating a digital signal of a predetermined pattern for a 2-phase modulated portion in the output of the demodulating means on the transmission side; inverting means for selectively code-inverting the I-Q symbol stream data output from the demodulating unit based on the value of a predetermined pattern regenerated by the regeneration means; a phase error table showing the phase error from the absolute phase for the received signal point in a predetermined quadrant; and phase error detecting means for converting a received signal point in the I-Q phase indicated by an output of the inverting unit into the one in a predetermined quadrant by performing a process depending on the current quadrant, reading the phase error data corresponding to the converted received signal point from the phase error table, and adjusting the read phase error data depending on the conversion. With the configuration, the carrier regeneration means amends the phase of the regenerated carrier according to the phase error data adjusted by the phase error detecting means.

The PSK modulated signal obtained by time-multiplexing the digital signal modulated in the 2-phase, 4-phase, and 8-phase PSK modulation system is demodulated using a carrier regenerated by the carrier regeneration means, and output as the I-Q symbol stream data in a symbol unit by the demodulating unit. The regeneration unit regenerates a well-known pattern for the portion obtained by 2-phase modulating the digital signal of the well-known pattern on the transmission side in the output of the demodulating unit, and the inverting unit selectively code-inverts the I-Q symbol stream data output from the demodulating means based on the value of the well-known pattern. The phase error table contains a phase error from the absolute phase for the received signal point in a predetermined quadrant in the I-Q phases indicated by the output of the inverting means. The phase error detecting means performs a process by combining any of the no-conversion process, the symmetric conversion about the I axis, the symmetric conversion about the Q axis, the symmetric conversion about the I=Q axis, and the symmetric conversion about the I=-Q axis, reads from the phase error table the phase error data corresponding to the received signal point converted in the predetermined quadrant defined in the phase error table, adjusts the read phase error data based on the combination of the conversion, and obtains the phase error data from the absolute phase for the received signal point in the I-Q phase indicated by an output of the inverting means. The carrier regeneration means amends the phase of the regenerated carrier based on the phase error data detected by the phase error detecting means.

According to the present invention, the phase error table can contain a phase error from the absolute phase for the received signal point in a predetermined quadrant in the first through the fourth quadrants in the I-Q phase, thereby considerably simplifying the circuit configuration.

BRIEF DESCRIPTION OF THE DRAWINGS

FIG. 13 shows the operation of the timing circuit shown in FIG. 10.

EMBODIMENT OF THE INVENTION

An embodiment of the present invention will be described below by referring to FIG. 1.

Figure 1:
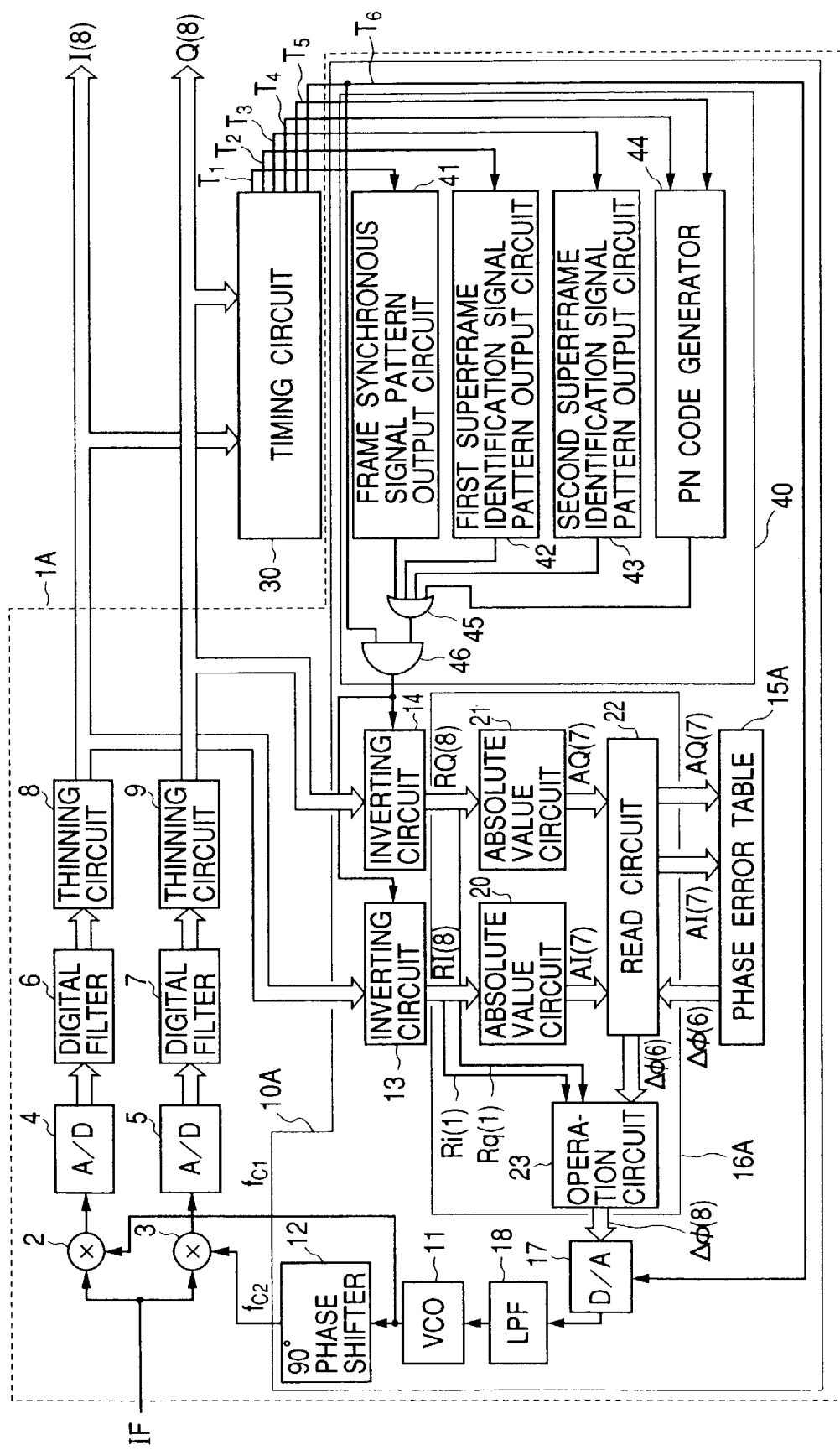
FIG. 1 is a block diagram of the configuration of a principal part of a PSK modulated wave receiver according to an embodiment of the present invention.

FIG. 1 is a block diagram of the configuration of the principal part of the broadcast receiver (PSK modulated wave receiver) according to the present invention. A component also shown in FIG. 10 are assigned the identical unit number.

Figure 10:
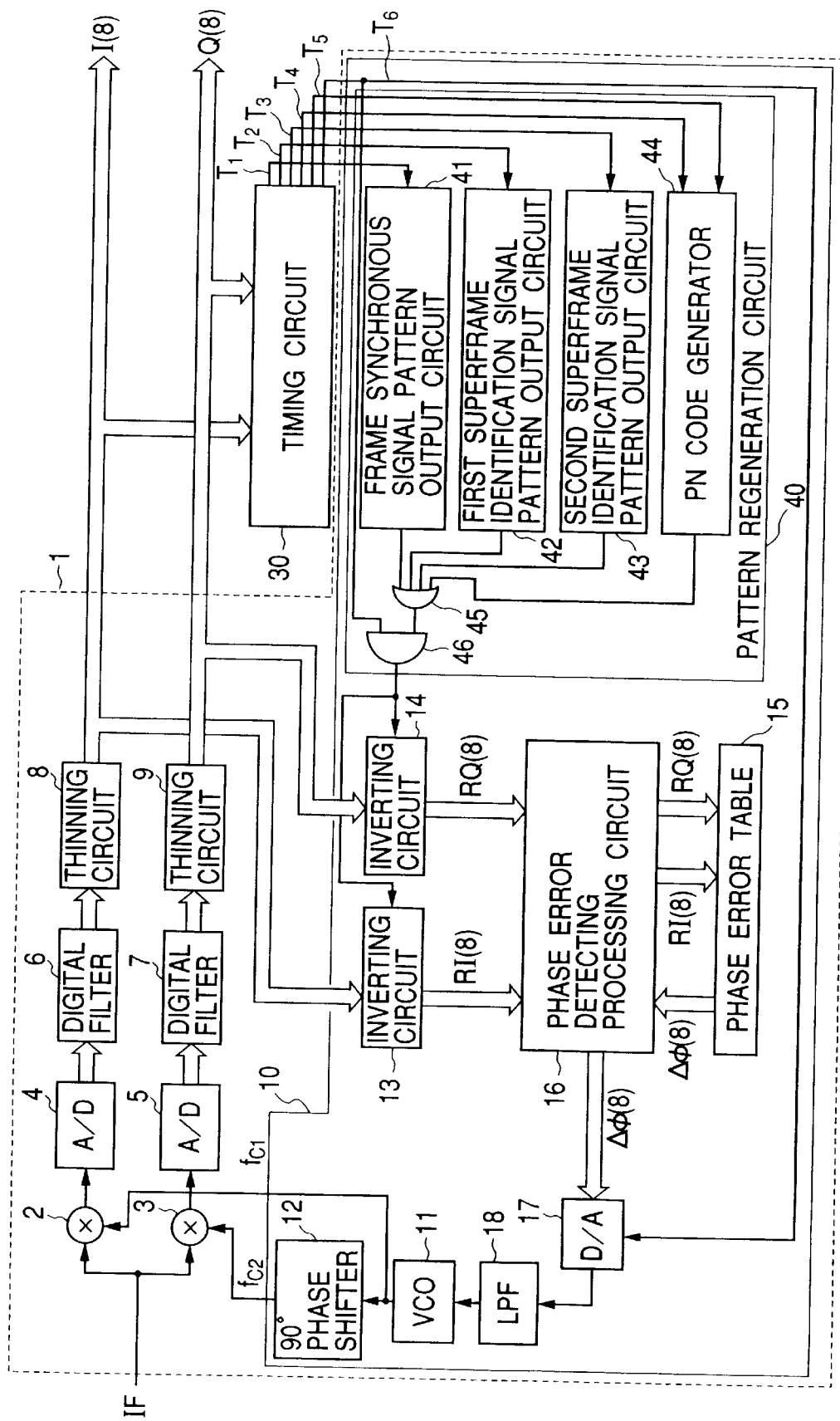
FIG. 10 is a block diagram of the configuration around a demodulating circuit of a PSK modulated wave receiver in the conventional hierarchical transmission system.

In FIG. 10, a phase error table 15 comprising ROM contains phase errors from the absolute phase for all received signal points in the first through the fourth quadrants in the I-Q phase indicated by the outputs of the inverting circuits 13 and 14. The phase error table 15A comprising the ROM shown in FIG. 1 contains phase errors from the absolute phase 0 (=2π) only for the received signal point in the first quadrant of the I-Q phase indicated by the outputs of the inverting circuits 13 and 14.

Figure 2:
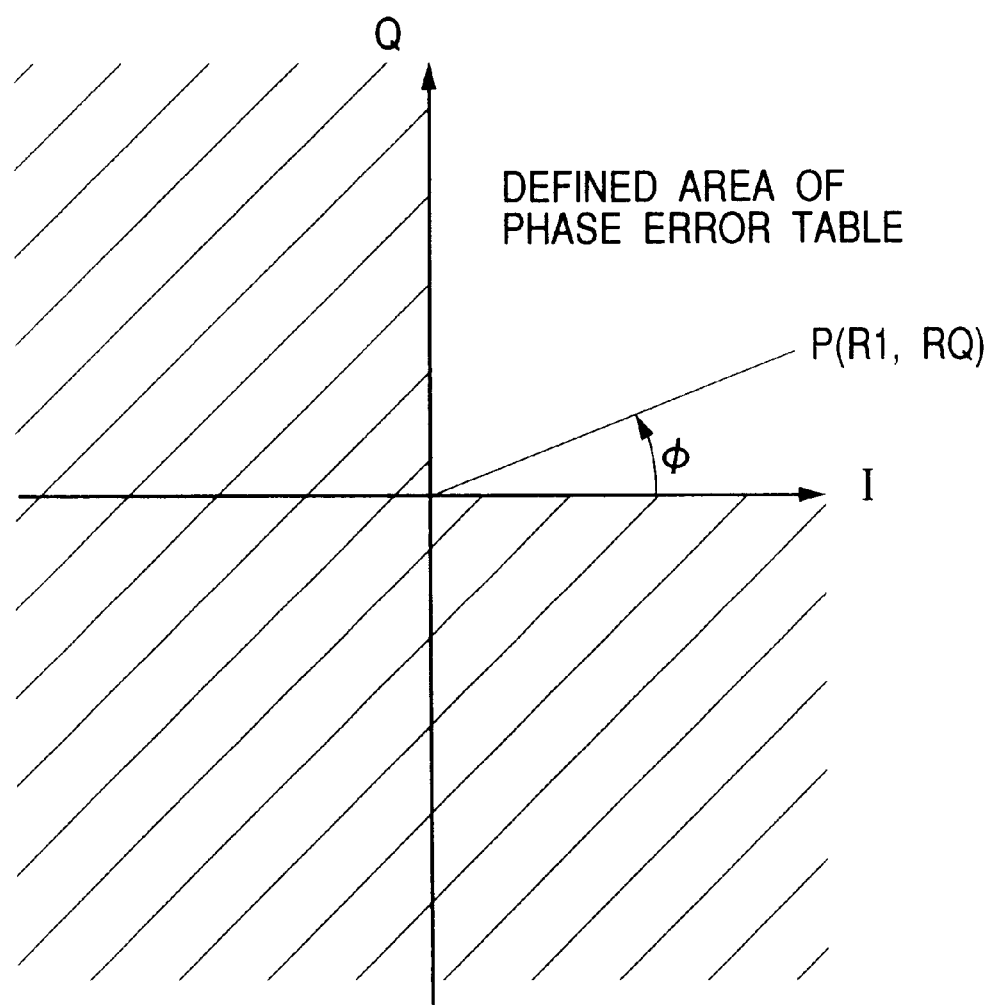
FIG. 2 shows the defined area of a phase error table shown in FIG. 1.
Figure 3:
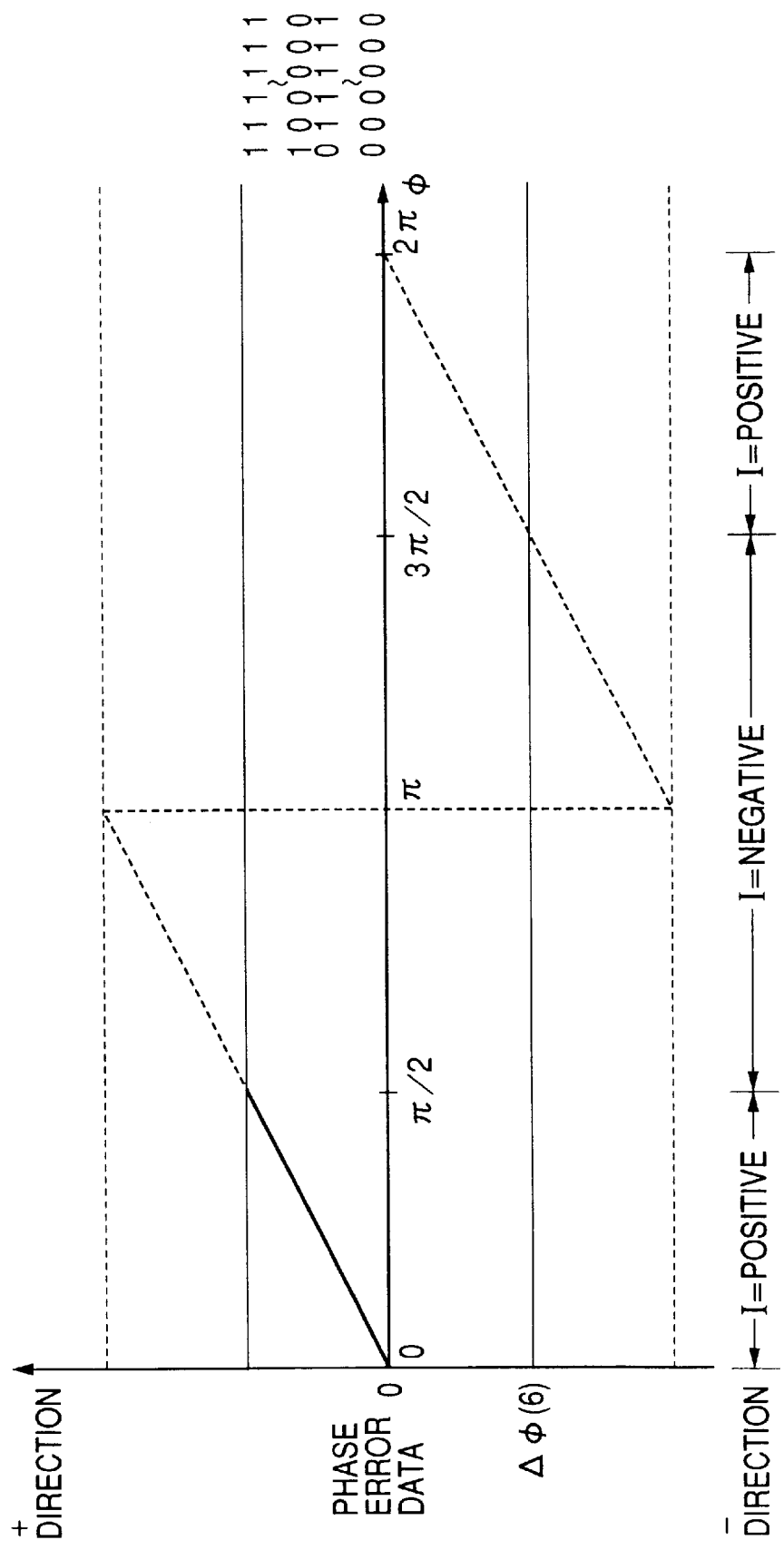
FIG. 3 shows the relationship between a phase angle of a received signal point and a phase error data in the phase error table shown in FIG. 1.

The defined area on the phase error table 15A refers to the range where I≧0, and Q≧0 in the I-Q phase (refer to the range other than the portion indicated by oblique lines shown in FIG. 2), and FIG. 3 shows the relationship between the phase angle φ (FIG. 2) made by the received signal point P in the I-Q phase using the outputs of the inverting circuits 13 and 14 and the positive direction of the I axis and the phase error data. In FIG. 3, the defined area is the range where φ=0 through π/2. On the phase error table 15 shown in FIG. 10, the phase error data is represented by an 8-bit complement of 2 (see FIG. 11) because the range of φ=0 through 2π is defined. However, the phase error of the received signal point in the first quadrant in the I-Q phase indicated by the outputs of the inverting circuits 13 and 14 is 0 or positive. Therefore, on the phase error table 15A shown in FIG. 1, the phase error data is represented by 6 bits using a natural binary number corresponding to the portion A shown in FIG. 11 (The phase error data is represented by Δφ (6)). At this time, the phase error data Δφ (6) corresponding to φ=0 is 000000, and the phase error data Δφ (6) corresponding to φ=π/2 is 111111.

In FIG. 1, in the phase error detecting processing circuit 16A provided in the carrier regeneration circuit 10A of the demodulating circuit 1A, 20 and 21 are absolute value circuits for obtaining the absolute values of the I-Q symbol stream data RI (8) and RQ (8) output respectively by the inverting circuits 13 and 14, converting them such that they can be positioned in the first quadrant, and outputting the conversion data AI (7) and AQ (7) of the I axis and the Q axis represented by 7-bit natural binary numbers of quantization bits. According to the absolute value circuits 20 and 21, when the received signal points in the I-Q phase indicated by the inverting circuits 13 and 14 are positioned in the first quadrant (RI (8)≧0, RQ (8)≧0), 7 bits excluding the MSB are output without conversion.

Figure 4:
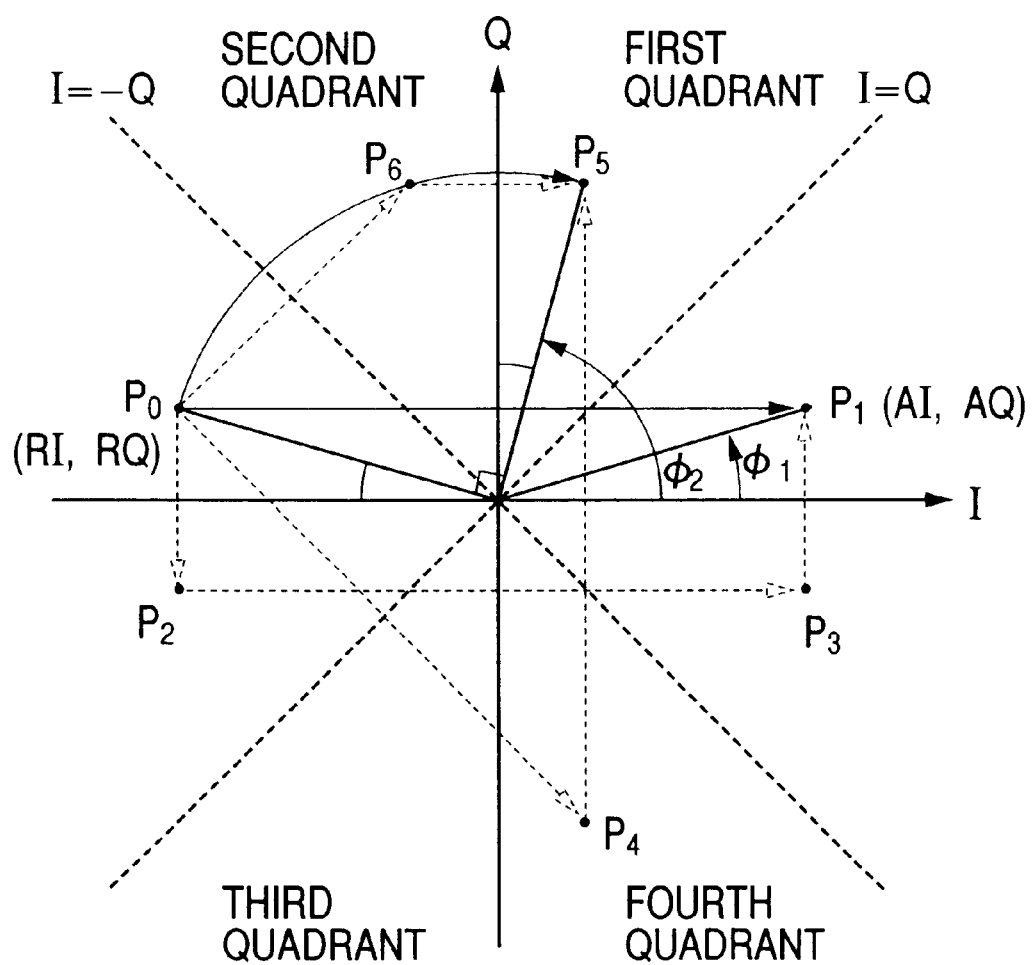
FIG. 4 shows the operation of an absolute value circuit shown in FIG. 1.

On the other hand, when the received signal points in the I-Q phase indicated by the outputs of the inverting circuits 13 and 14 are positioned in the second quadrant (RI (8)<0, RQ (8)≧0) as indicated by P₀ (RI (8), RQ (8)) shown in FIG. 4, they are symmetrically converted about the Q axis by the absolute value circuits 20 and 21 and positioned at P1 (AI (8), AQ (8)) in the first quadrant (P₀ can be shifted to P₂ through the symmetric conversion about the I axis, to P₃ through the symmetric conversion about the Q axis, and then to P₁ through the symmetric conversion about the I axis).

Figure 5:
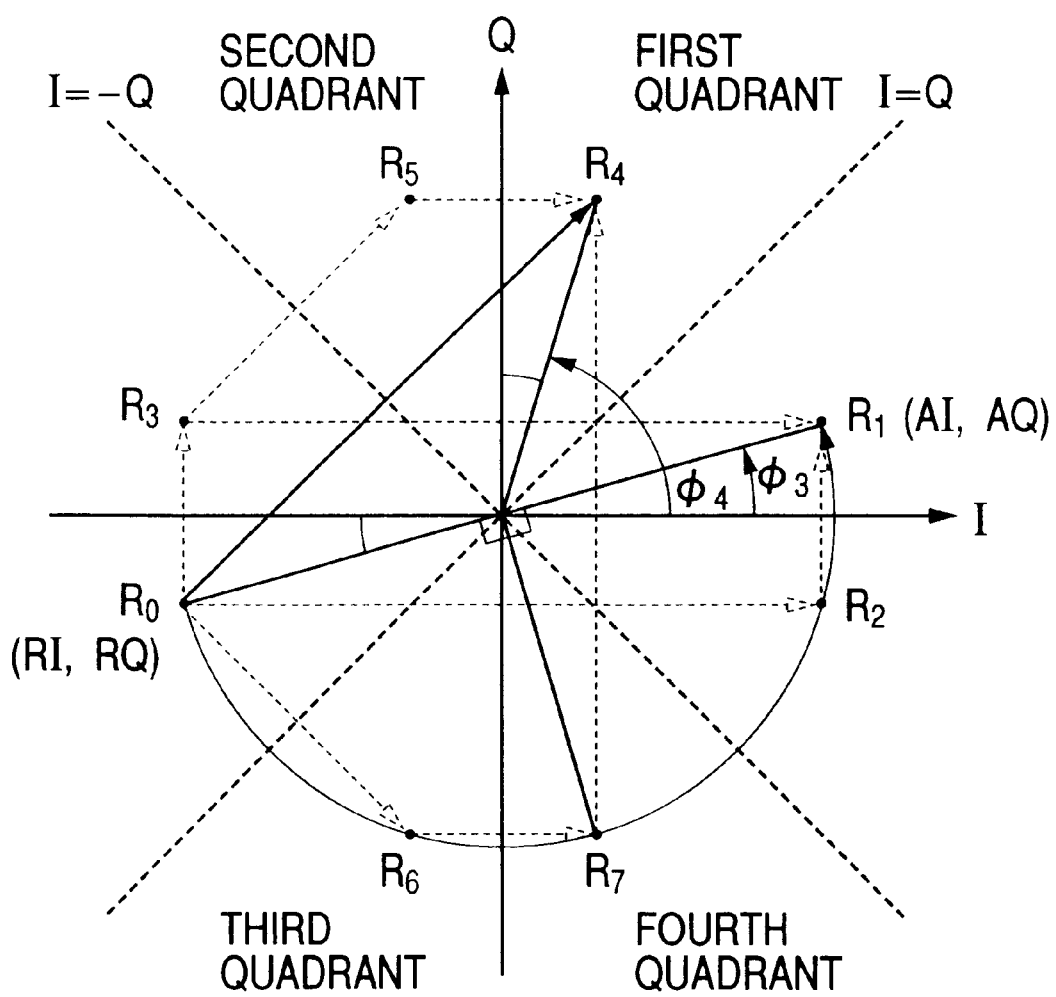
FIG. 5 shows the operation of the absolute value circuit shown in FIG. 1.

In addition, when the received signal points in the I-Q phase indicated by the outputs of the inverting circuits 13 and 14 are positioned in the third quadrant (RI (8)<0, RQ (8)<0) as indicated by R₀ (RI (8), RQ (8)) shown in FIG. 5, they are symmetrically converted about the origin by the absolute value circuits 20 and 21 and positioned at R₁ (AI (8), AQ (8)) in the first quadrant (R₀ can be shifted to R₂ through the symmetric conversion about the Q axis, and to R₁ through the symmetric conversion about the I axis, or R₀ can be shifted to R₃ through the symmetric conversion about the I axis, and to R₁ through the symmetric conversion about the Q axis. Furthermore, R₁ can be assumed to be rotated counterclockwise by π about the origin).

Figure 6:
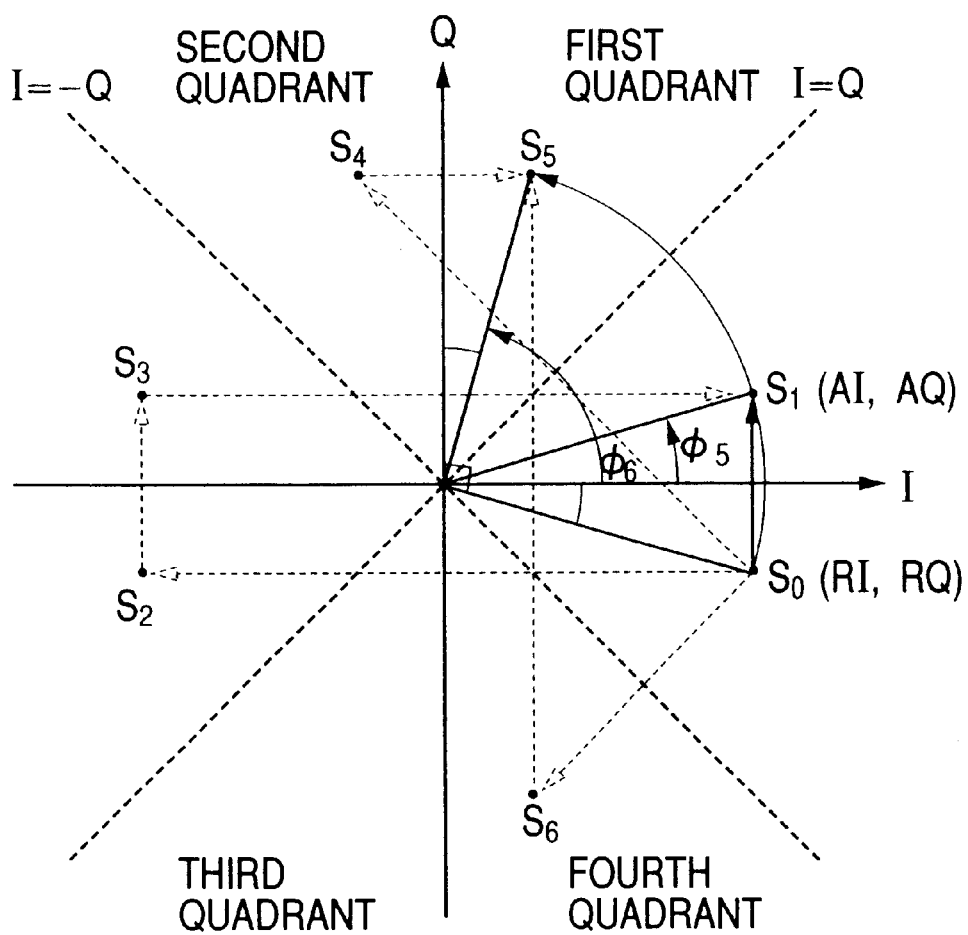
FIG. 6 shows the operation of the absolute value circuit shown in FIG. 1.

Furthermore, when the received signal points in the I-Q phase indicated by the outputs of the inverting circuits 13 and 14 are positioned in the fourth quadrant (RI (8)≧0, RQ (8)<0) as indicated by S₀ (RI (8), RQ (8)) shown in FIG. 6, they are symmetrically converted about the I axis by the absolute value circuits 20 and 21 and positioned at S₁ (AI (8), AQ (8)) in the first quadrant ($S_0$ can be shifted to $S_2$ through the symmetric conversion about the Q axis, and to $S_3$ through the symmetric conversion about the I axis. Furthermore, it can be assumed to be shifted to $S_1$ through the symmetric conversion about the Q axis).

22 is a read circuit for reading the phase error data $\Delta\phi$ (6) corresponding to the conversion data AI (7) and AQ (7) of the I and Q axes output from the absolute value circuits 20 and 21 from the phase error table 15A. 23 is an operation circuit as an adjusting unit, adjusts the phase error data $\Delta\phi$ (6) depending on the conversion combination for the received signal point indicated by the outputs of the inverting circuits 13 and 14 to enter the first quadrant, and obtains the phase error data from the absolute phase for the received signal point in the first through the fourth quadrants in the I-Q phase indicated by the outputs of the inverting circuits 13 and 14.

The operation circuit 23 practically obtains the phase error data from the absolute phase for the received signal point in the first through the fourth quadrant in the I-Q phase indicated by the outputs of the inverting circuits 13 and 14, and outputs the result to the D/A converter 17 by performing a predetermined operation on the phase error data $\Delta\phi$ (6) based on the Ri (1) and Rq (1) because the combination of the codes indicated by the code bits Ri (1) and Rq (1), which are the MSB of the I-Q symbol stream data RI (8) and RQ (8), indicates the current quadrant of the received signal point in the I-Q phase, and the conversion combination depends on the current quadrant (the first through the fourth quadrants).

The operation circuit 23 outputs the phase error data $\Delta\phi$ (8) as a 8-quantization-bit complement of 2. The operation of the operation circuit 23 can be explained as follows. That is, when Ri (1) and Rq (1) are 0, the received signal point indicated by the outputs of the inverting circuits 13 and 14 is positioned in the first quadrant of the I-Q phase, and the non-conversion process is performed by the inverting circuits 13 and 14, the phase error is in the range from 0 to $+\pi/2$. Therefore, '00' is added to the higher order of the phase error data $\Delta\phi$ (6), thereby outputting an 8-bit data (the 8 bits are processed as a complement of 2 by the D/A converter 17, and the highest order '0' indicates the phase error as a positive value).

When Ri (1) is 1, Rq (1) is 0, the received signal point indicated by the outputs of the inverting circuits 13 and 14 is positioned in the second quadrant of the I-Q phase, and the symmetric conversion is performed about the Q axis by the inverting circuits 13 and 14, the phase error of $P_0$ is in the range from $+\pi/2$ to $\pi$. As shown in FIG. 4, the angle made by the negative direction of the I axis and $P_0$ is equal to the angle $\phi_1$ made by the positive direction of the I axis and $P_1$, and the phase error of $P_0$ is $+(\pi-\phi_1)$. Therefore, the phase error data $\Delta\phi$ (6) $(=\phi_1)$ is subtracted from a 7-bit natural binary '1111111' $(=\pi)$, '0' is added to a higher order position, and the result is output as 8-bit data (the 8 bits are processed as a complement of 2 by the D/A converter 17, and the highest order '0' indicates the phase error as a positive value).

When Ri (1) and Rq (1) are 1, the received signal point indicated by the outputs of the inverting circuits 13 and 14 is positioned in the third quadrant of the I-Q phase, the symmetric conversion is performed about the Q axis by the inverting circuits 13 and 14, and furthermore performed about the I axis, the phase error is in the range from $-\pi/2$ to $-\pi$. As shown in FIG. 5, the angle made by the negative direction of the I axis and $R_0$ is equal to the angle $\phi_3$ made by the positive direction of the I axis and $R_1$, and the phase error of $R_0$ is $-(\pi-\phi_3)$. Therefore, the phase error data $\Delta\phi$ (6) $(=\phi_1)$ is subtracted from '1111111' $(=\pi)$, '0' is added to a higher order position, and the result is output as 8-bit data (the 8 bits are processed as a complement of 2 by the D/A converter 17, and the highest order '1' indicates the phase error as a negative value).

When Ri (1) and Rq (1) are 0, the received signal point indicated by the outputs of the inverting circuits 13 and 14 is positioned in the fourth quadrant of the I-Q phase, and the symmetric conversion is performed about the I axis by the inverting circuits 13 and 14, the phase error is in the range from 0 to $-\pi/2$. As shown in FIG. 6, the angle made by the positive direction of the I axis and $S_0$ is equal to the angle $\phi_5$ made by the positive direction of the I axis and $S_1$, and the phase error of $S_0$ is $-\phi_5$. Therefore, '00' is added to a higher order position of phase error data $\Delta\phi$ (6), and the result is output as 8-bit data as a complement of 2 (the 8 bits are processed as a complement of 2 by the D/A converter 17, and the highest order '1' indicates the phase error as a negative value).

Figure 11:
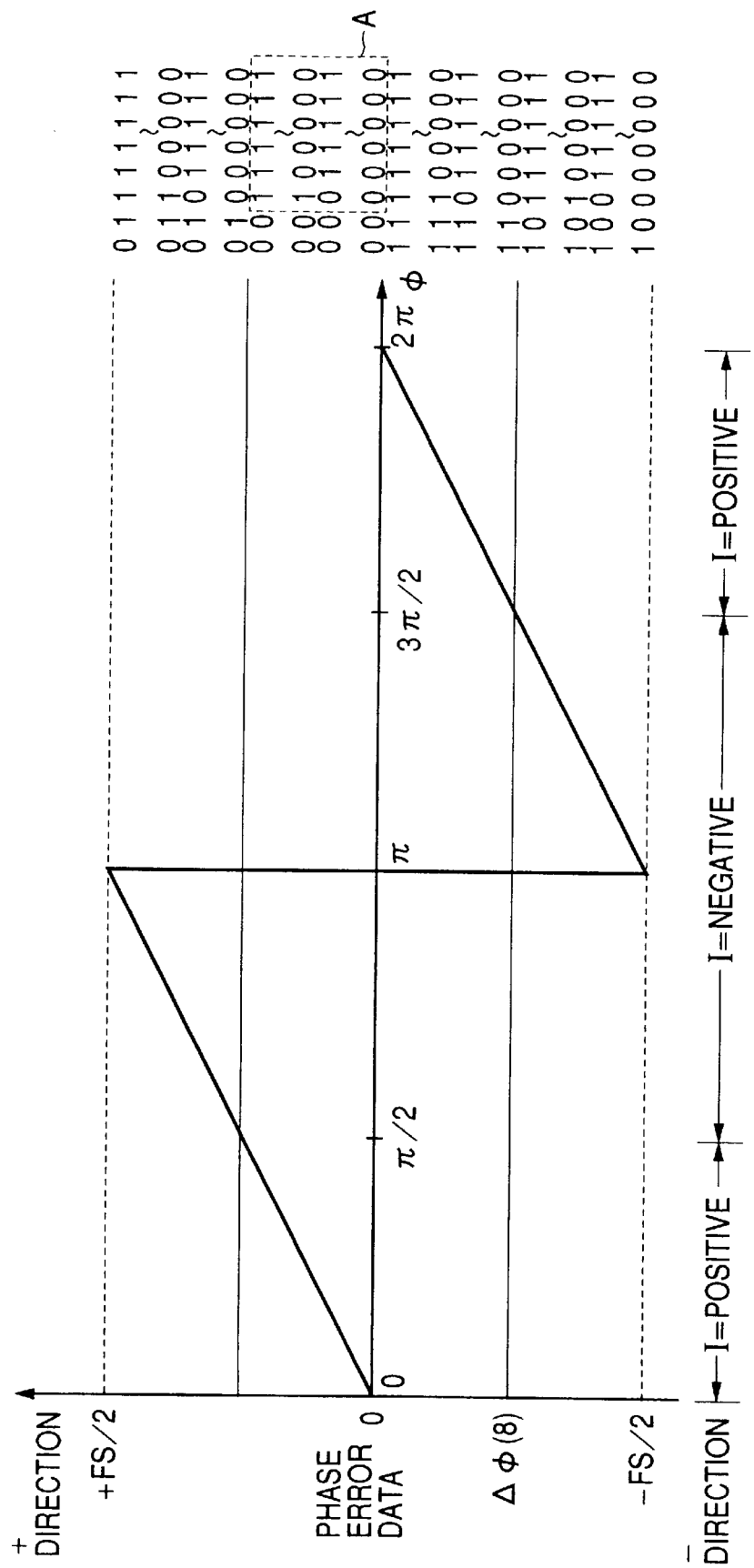
FIG. 11 shows the relationship between the phase angle of a received signal point and a phase error data in a phase error table shown in FIG. 10.

Thus, the operation circuit 23 outputs the phase error data $\Delta\phi$ (8) as a 8-bit complement of 2 from the absolute phase for the received signal point in the I-Q phase indicated by the outputs of the inverting circuits 13 and 14 (FIG. 11).

Figure 9A:
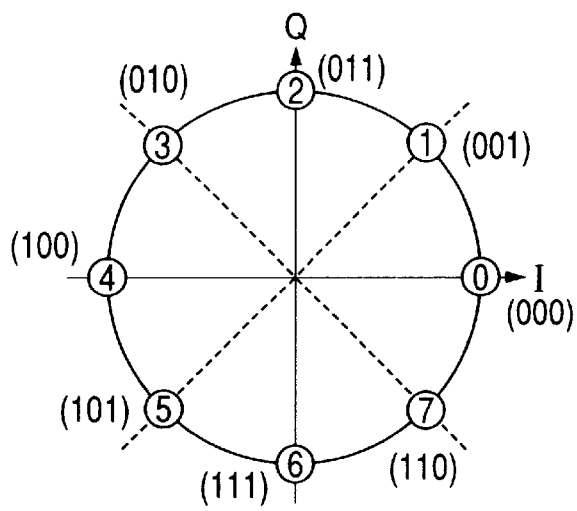
FIGS. 9A–9C show a signal point arrangements in a PSK mapping.
Figure 9B:
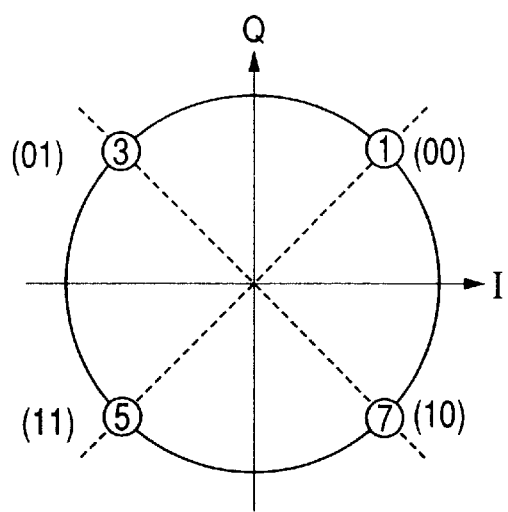
Figure 9C:
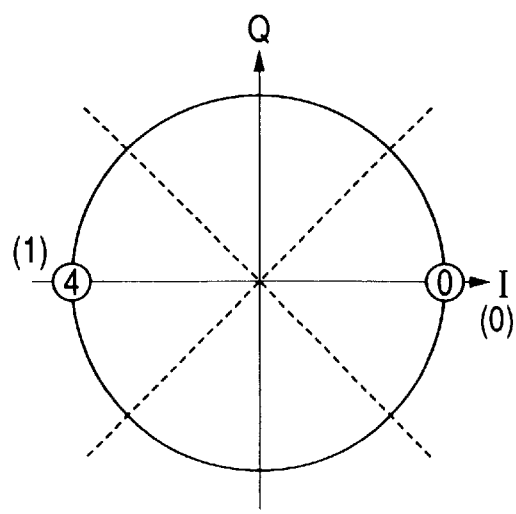
Figure 12:
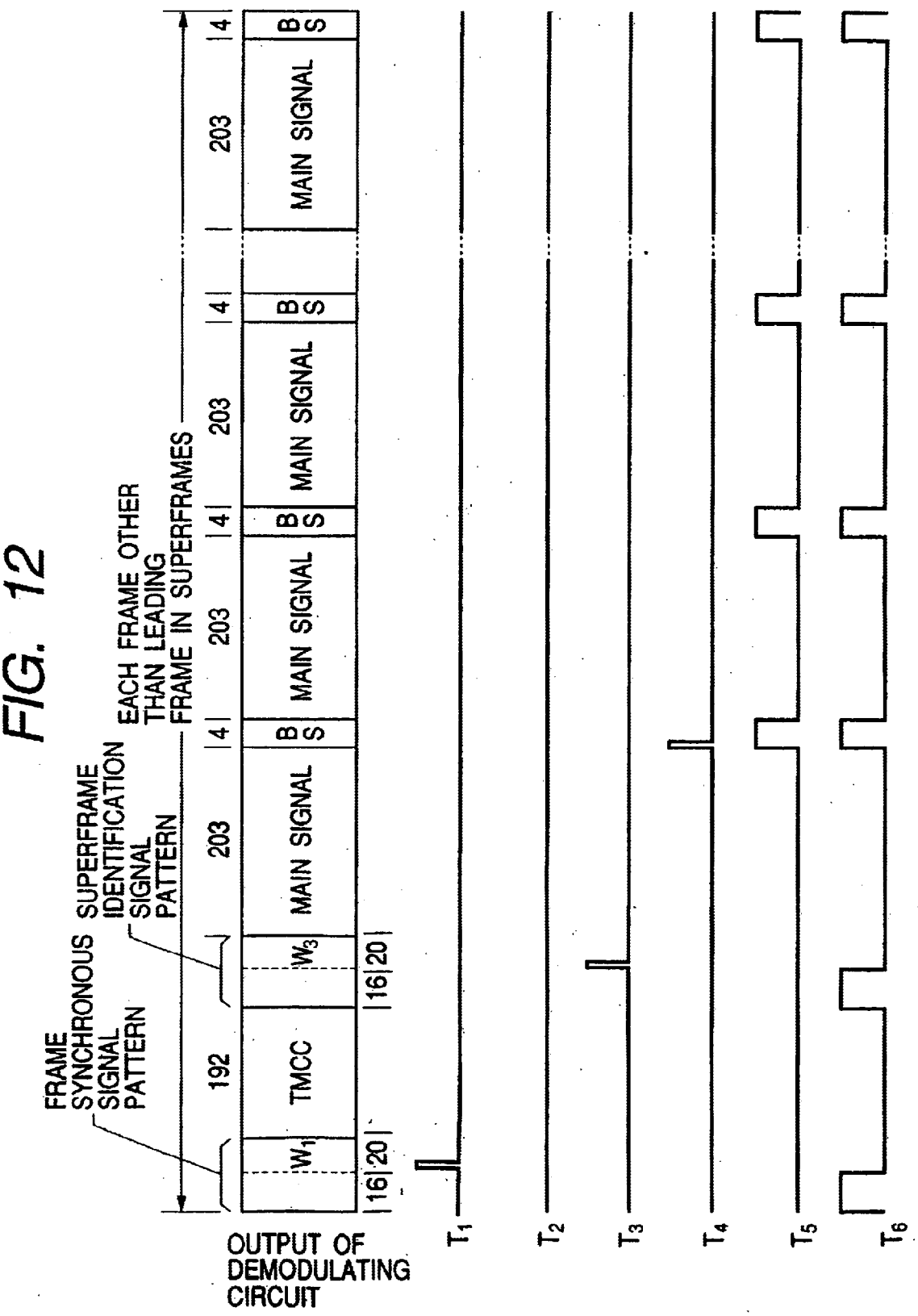
FIG. 12 shows the operation of a timing circuit shown in FIG. 10.

The other units in the configuration shown in FIG. 1 are the same as those shown in FIG. 10, and the timing circuit 30 generates four timing signals $T_1$ through $T_4$ and two period signals $T_5$ and $T_6$ from the output of the demodulating circuit 1A (FIGS. 12 and 13). Using these $T_1$ through $T_6$, the pattern regeneration circuit 40 regenerates a corresponding bit string pattern for the symbol portion corresponding to the 20-bit frame synchronous signal pattern $W_1$ appearing in the I-Q symbol stream output from the demodulating circuit 1A, the symbol portion corresponding to the 20-bit superframe identification signal patterns $W_2$ and $W_3$, and the portion of the burst symbol signal (BS). The PN codes obtained before the BPSK mapping process of the $W_1$, $W_2$, and $W_3$, and the burst symbol signal (BS) refer to a well-known bit string pattern on the transmission side, and they are all BPSK-mapped. As shown in FIG. 9C, the bit '0' is mapped at the signal point arrangement '0' on the transmission side (absolute phase 0), and the bit '1' is mapped at the signal point arrangement '1' on the transmission side (absolute phase $\pi$).

The inverting circuits 13 and 14 outputs the I-Q base band signals I (8) and (Q) output from the demodulating circuit 1A as is when the output of the pattern regeneration circuit 40 is a bit '0'. At this time, the original absolute phase of the received signal point on the transmission side indicated by the outputs RI (8)=I (8) and RQ (8)=Q (8) of the inverting circuits 13 and 14 is 0. On the other hand, the inverting circuits 13 and 14 invert the codes of the I-Q base band signals output from the demodulating circuit 1A when the output of the pattern regeneration circuit 40 is a bit '1'. Inverting a code refers to forwarding the phase of a received signal point by $\pi$. Thus, the original absolute phase of the received signal point on the transmission side indicated by the outputs RI (8)=−I (8) and RQ (8)=−Q (8) of the inverting circuits 13 and 14 can also be assumed to be 0 $(=2\pi)$.

When the output of the pattern regeneration circuit 40 is '0', the phase error detecting processing circuit 16A performs a process by arbitrarily combining the received signal point in the I-Q phase indicated by the outputs of the inverting circuits 13 and 14 with the non-conversion, the symmetric conversion about the I axis, and the symmetric conversion about the Q axis according to the current quadrant from the phase error table 15A, reads the phase error data Δϕ (6) corresponding to the received signal point converted in the first quadrant, adjusts the phase error data Δϕ (6) based on the combination of the conversion, obtains the phase error data Δϕ (8) from the absolute phase for the received signal point in the I-Q phase indicated by the outputs of the inverting circuits 13 and 14, outputs the result to the D/A converter 17, and amends the phase of the reference carriers $f_{c1}$ and $f_{c2}$ such that the phase error data Δϕ (8) can be zero, thereby performing the amending process with the target convergence point of the phase of the received signal point set to 0 after the demodulation of the transmission signal BPSK-mapped at the bit '0' on the transmission side.

When the output of the pattern regeneration circuit 40 is '1', the phase error detecting processing circuit 16A performs a process by arbitrarily combining the received signal point in the I-Q phase indicated by the outputs of the inverting circuits 13 and 14 with the non-conversion, the symmetric conversion about the I axis, and the symmetric conversion about the Q axis according to the current quadrant from the phase error table 15A, reads the phase error data Δϕ (6) corresponding to the received signal point converted in the first quadrant, adjusts the phase error data Δϕ (6) based on the combination of the conversion, obtains the phase error data Δϕ (8) from the absolute phase for the received signal point in the I-Q phase indicated by the outputs of the inverting circuits 13 and 14, outputs the result to the D/A converter 17, and amends the phase of the reference carriers $f_{c1}$ and $f_{c2}$ such that the phase error data Δϕ (8) can be zero, thereby performing the amending process with the target convergence point of the phase of the received signal point set to π after the demodulation of the transmission signal SPSK-mapped at the bit '0' on the transmission side.

Thus, an I-Q base band signal in an absolute phase can be output from the demodulating circuit 1A, and a decoder at a later stage can perform the PSK demapping process without an error.

According to the above described, embodiment, the phase error table 15A can define only the first quadrant in the I-Q phase as a defined area. Therefore, as compared with the case in which all of the first through the fourth quadrants are set as defined areas, a quarter or less capacity of ROM can be used, thereby considerably simplifying the circuit configuration.

Figure 7:
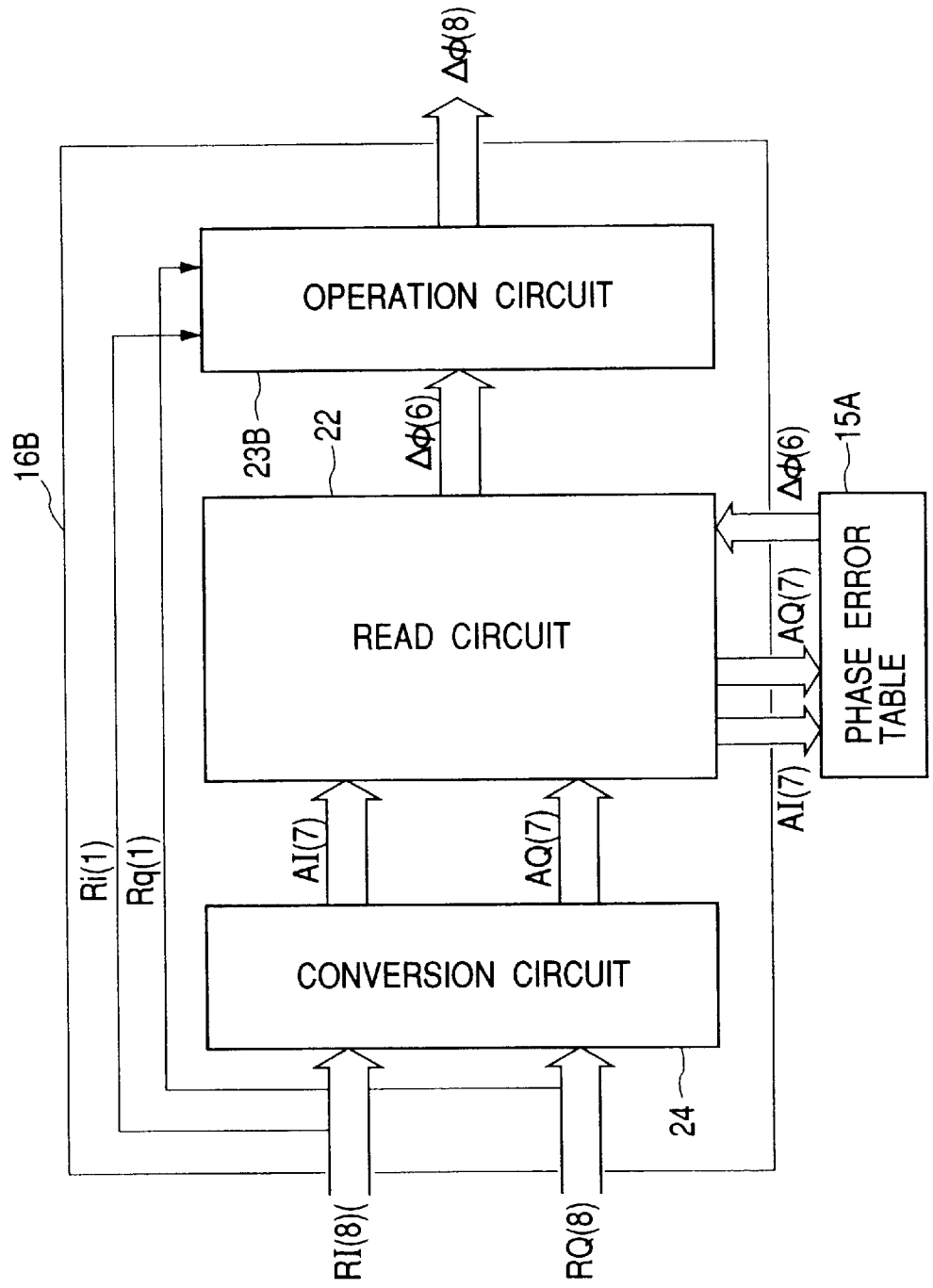
FIG. 7 is a block diagram of the configuration of a phase error detecting processing circuit according to a variation of the present invention.
Figure 8:
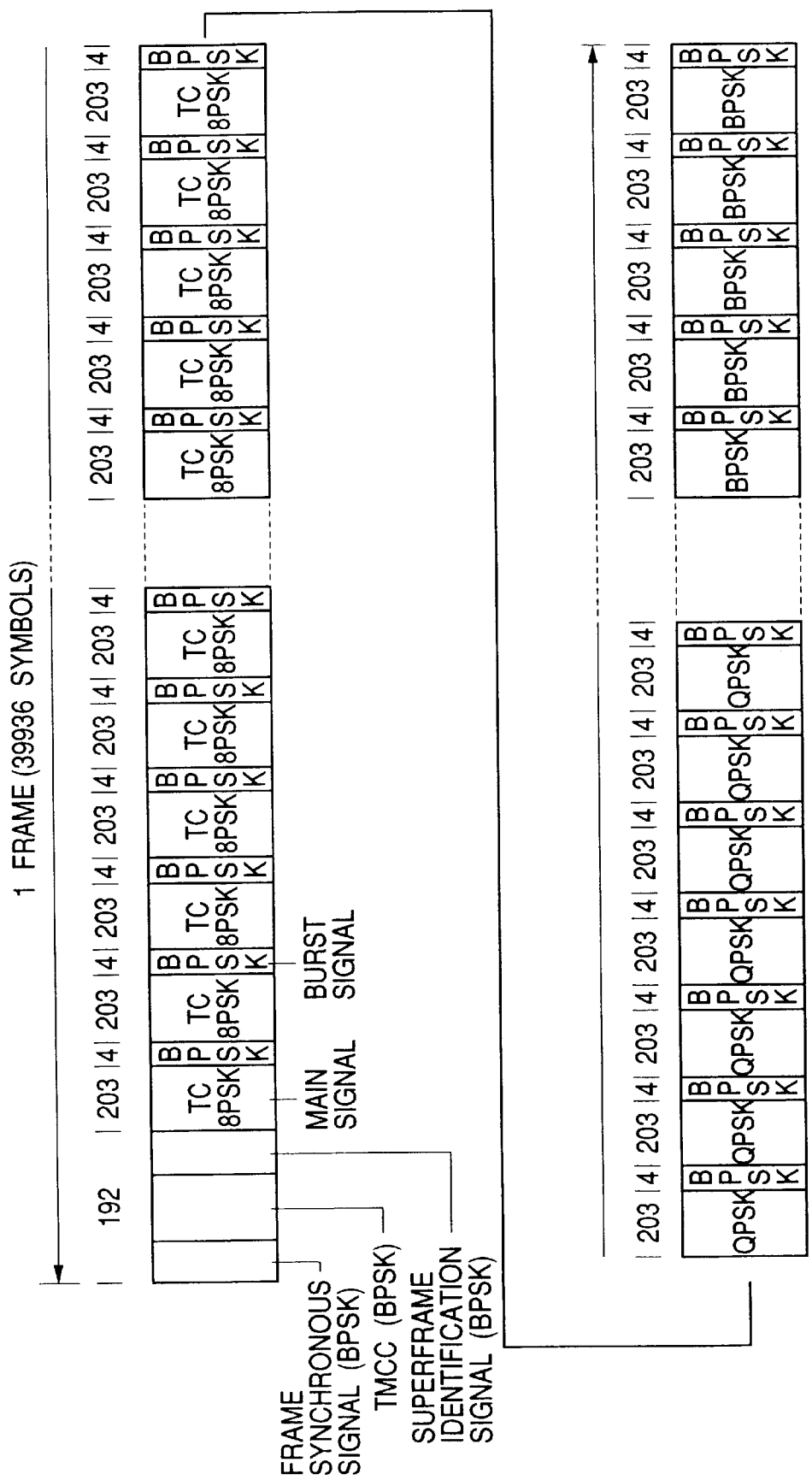
FIG. 8 shows an example of the configuration of a transmission frame in a hierarchical transmission system.

FIG. 7 is a block diagram of the configuration of the phase error detecting processing circuit according to a variation of the present invention. A component also shown in FIG. 1 is assigned the identical unit number.

In the phase error detecting processing circuit 16B shown in FIG. 7, 24 is a conversion circuit for performing a process by combining any of the no-conversion process, the symmetric conversion about the I axis, the symmetric conversion about the Q axis, the symmetric conversion about the I=Q axis, and the symmetric conversion about the I=−Q axis depending on the current quadrant of the received signal point indicated by the RI (8) and RQ (8) for the I-Q symbol stream data RI (8) and RQ (8) output from the inverting circuits 13 and 14, converting them such that they can enter the first quadrant which is a defined area of the phase error table 15A, and outputting the conversion data AI (7) and AQ (7) represented by 7-quantization-bit natural binary.

The conversion circuit 24 outputs 7 bits without conversion excluding the MSB when the received signal point in the I-Q phase indicated by the outputs of the inverting circuits 13 and 14 is positioned in the first,quadrant (RI (8)≧0, RQ (8)≧0).

On the other hand, when the received signal points in the I-Q phase indicated by the outputs of the inverting circuits 13 and 14 are positioned in the second quadrant (RI (8)<0, RQ (8)≧0) as indicated by P0 (RI (8), RQ (8)) shown in FIG. 4, the conversion circuit 24 moves it to $P_4$ in the symmetric conversion about the I=Q axis, and then to $P_5$ in the symmetric conversion about the I axis in the first quadrant (the conversion circuit 24 can also move $P_0$ to $P_6$ in the symmetric conversion about the I=−Q axis, and then to $P_5$ in the symmetric conversion about the Q axis).

Furthermore, when the received signal points in the I-Q phase indicated by the outputs of the inverting circuits 13 and 14 are positioned in the third quadrant (RI (8)<0, RQ (8)≧0) as indicated by $R_0$ (RI (8), RQ (8)) shown in FIG. 5, the conversion circuit 24 moves it to $R_4$ in the first quadrant in the symmetric conversion about the I=−Q axis (the conversion circuit 24 can move $R_0$ to $R_3$ in the symmetric conversion about the I axis, and to $R_5$ in the symmetric conversion about the I=−Q axis, and then to $R_4$ in the symmetric conversion about the Q axis, or can move $R_0$ to $R_6$ in the symmetric conversion about the I=Q axis, and then to $R_7$ in the symmetric conversion about the Q axis, and further to $R_4$ in the symmetric conversion about the I axis).

When the received signal points in the I-Q phase indicated by the outputs of the inverting circuits 13 and 14 are positioned in the fourth quadrant (RI (8)≧0, RQ (8)<0) as indicated by $S_0$ (RI (8), RQ (8)) shown in FIG. 6, the conversion circuit 24 moves $S_0$ to $S_4$ about the I=Q axis, and then to $S_5$ in the first quadrant in the symmetric conversion about the Q axis (the conversion circuit 24 can also move $S_0$ to $S_6$ in the symmetric conversion about the I=−Q axis, and then to $S_5$ in the symmetric conversion about the I axis).

22 is a read circuit for reading the phase error data Δϕ (6) corresponding to the conversion data AI (7) and AQ (7) of the I and Q axes output from the absolute value circuits 20 and 21 from the phase error table 15A. 23B is an operation circuit as an adjusting unit, adjusts the phase error data Δϕ (6) depending on the conversion combination for the received signal point indicated by the outputs of the inverting circuits 13 and 14 to enter the first quadrant, and obtains the phase error data from the absolute phase for the received signal point in the I-Q phase indicated by the outputs of the inverting circuits 13 and 14.

The operation circuit 23B practically obtains the phase error data from the absolute phase for the received signal point in the first through the fourth quadrant in the I-Q phase indicated by the outputs of the inverting circuits 13 and 14, and outputs the result to the D/A converter 17 by performing a predetermined operation on the phase error data Δϕ (6) based on the Ri (1) and Rq (1) because the combination of the codes indicated by the code bits Ri (1) and Rq (1), which are the MSB of the I-Q symbol stream data RI (8) and RQ (8), indicates the current quadrant of the received signal point in the I-Q phase, and the conversion combination depends on the current quadrant (the first through the fourth quadrants).

The operation circuit 23B outputs the phase error data Δϕ (8) as a 8-quantization-bit complement of 2. The operation of the operation circuit 23B can be explained as follows. That is, when Ri (1) and Rq (1) are 0, the received signal point indicated by the outputs of the inverting circuits 13 and 14 is positioned in the first quadrant of the I-Q phase, and the non-conversion process is performed by the conversion circuit 24, the phase error is in the range from 0 to $+\pi/2$. Therefore, '00' is added to the higher order of the phase error data $\Delta\phi$ (6), thereby outputting an 8-bit data (the 8 bits are processed as a complement of 2 by the D/A converter 17, and the highest order '0' indicates the phase error as a positive value).

When Ri (1) is 1, Rq (1) is 0, and the received signal point indicated by the outputs of the inverting circuits 13 and 14 is positioned in the second quadrant of the I-Q phase, the phase error of $P_0$ is in the range from $+\pi/2$ to $\pi$. As shown in FIG. 4, if the angle made by $P_0$, the origin, and $P_5$ is $\pi/2$, and the angle made by the positive direction of the I axis and $P_5$ is $\pi/2$, then the phase error of $P_0$ is $+(+_2+\pi/2)$. Therefore, the value obtained by adding '00' to the higher order in '1111111' ($=\pi/2$) is added up to the value obtained by adding '00' to the higher order in the phase error data $\Delta\phi$ (6), and the result is output as 8 bits (the 8 bits are processed as a complement of 2 by the D/A converter 17, and the highest order '0' indicates the phase error as a positive value).

When Ri (1) and Rq (1) are 1, the received signal point indicated by the outputs of the inverting circuits 13 and 14 is positioned in the third quadrant of the I-Q phase, the phase error is in the range from $-\pi/2$ to $-\pi$. As shown in FIG. 5, the angle made by the negative direction of the I axis and $R_0$ is equal to the angle made by the positive direction of the Q axis and $R_4$. If the angle made by the positive direction of the I axis and $R_4$ is $\phi_4$, then the phase error of $R_0$ is $-(\pi+\phi_4)$. Therefore, '1111111' ($=\pi$) is added to the phase error data $\Delta\phi$ (6), '90' is added to a higher order, and the result is output as a 8-bit complement of 2 (the 8 bits are processed as a complement of 2 by the D/A converter 17, and the highest order '1' indicates the phase error as a negative value).

When Ri (1) and Rq (1) are 0, and the received signal point indicated by the outputs of the inverting circuits 13 and 14 is positioned in the fourth quadrant of the I-Q phase, the phase error is in the range from 0 to $-\pi/2$. As shown in FIG. 6, when the angle made by the positive direction of the I axis and $S_0$ is equal to the angle made by the positive direction of the Q axis and $S_5$, the angle made by the positive direction of the I axis and $S_5$ is $\phi_6$, the phase error of $S_0$ is $-(\pi/2-\phi_6)$. Therefore, '00' is added to a higher order position of phase error data $\Delta\phi$ (6), and the result is output as 8-bit data as a complement of 2 (the 8 bits are processed as a complement of 2 by the D/A converter 17, and the highest order '1' indicates the phase error as a negative value).

Thus, the operation circuit 23B outputs the phase error data $\Delta\phi$ (8) as a 8-bit complement of 2 from the absolute phase for the received signal point in the I-Q phase indicated by the outputs of the inverting circuits 13 and 14 (FIG. 11).

In this example shown in FIG. 7, the phase error table 15A can define only the first quadrant in the I-Q phase as a defined area. Therefore, as compared with the case in which all of the first through the fourth quadrants are set as defined areas, a quarter or less capacity of ROM can be used, thereby considerably simplifying the circuit configuration.

The combination for conversion by the inverting circuits 13 and 14 shown in FIG. 1 and the conversion circuit 24 shown in FIG. 7 is only an example, and the present invention is not limited to this application. That is, the received signal point in the I-Q phase indicated by an output of an inverting unit can be processed by combining any of the non-conversion process, the symmetric conversion process about the I axis, the symmetric conversion process about the Q axis, the symmetric conversion about the I=Q axis, and the symmetric conversion about the I=-Q axis according to the current quadrant, the phase error data corresponding to the received signal point converted into the first quadrant is read, the read phase error data is adjusted based on the combination of the conversion, and the phase error data can be obtained from the absolute phase for the received signal point in the I-Q phase indicated by an output of an inverting unit.

Industrial Applicability

According to the present invention, the phase error table contains a phase error from the absolute phase for the received signal point in the first quadrant of the I-Q phase, thereby considerably simplifying the circuit configuration.

What is claimed is:

1. A demodulating apparatus of a receiver having demodulating means for demodulating a PSK modulated signal obtained by time-multiplexing digital signals modulated in various PSK modulation systems by using a carrier regenerated by carrier regeneration means, and for outputting an I-Q symbol stream data of a symbol unit comprising:

regeneration means for regenerating a predetermined pattern for a portion of outputs of the demodulating means obtained by 2-phase-modulating a digital signal of the predetermined pattern on a transmission side;

inverting means for selectively inverting a code of I-Q symbol stream data output from said demodulating means depending on a value of the predetermined pattern regenerated by said regeneration means;

a phase error table showing a phase error from an absolute phase for a received signal point in a predetermined quadrant; and phase error detecting means for converting a received signal point in an I-Q phase indicated by an output of said inverting means into a predetermined quadrant by performing a process depending on a current quadrant, reading phase error data corresponding to the converted received signal point from said phase error table, and adjusting the read phase error data based on conversion, wherein said phase error detecting means amends a phase of a regenerated carrier according to the phase error data adjusted by said phase error detecting means.

2. A receiver according to claim 1, wherein said process includes at least one of a non-conversion process, a symmetric conversion process about an I axis, a symmetric conversion process about an Q axis, a symmetric conversion process about an I=Q axis, a symmetric conversion process about an I=-Q axis.

* * * * *